United States Patent
Komaki (10) Patent No.: US 7,984,310 B2
(45) Date of Patent: Jul. 19, 2011

(54) CONTROLLER, INFORMATION PROCESSING APPARATUS AND SUPPLY VOLTAGE CONTROL METHOD

(75) Inventor: Hiroaki Komaki, Tachikawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 866 days.

(21) Appl. No.: 11/947,364

(22) Filed: Nov. 29, 2007

(65) Prior Publication Data

US 2008/0129274 A1  Jun. 5, 2008

(30) Foreign Application Priority Data

Nov. 30, 2006  (JP) ................................. 2006-324912

(51) Int. Cl.
*G06F 1/00* (2006.01)
(52) U.S. Cl. .................... 713/300; 713/340; 323/285
(58) Field of Classification Search .................. 713/300, 713/340; 323/285
See application file for complete search history.

(56) References Cited

U.S. PATENT DOCUMENTS

| | | | |
|---|---|---|---|
| 5,734,914 A * | 3/1998 | Nakamura et al. | 713/300 |
| 6,566,848 B2 * | 5/2003 | Horigan et al. | 323/283 |
| 6,922,783 B2 * | 7/2005 | Knee et al. | 713/320 |
| 7,028,196 B2 * | 4/2006 | Soltis et al. | 713/300 |
| 7,093,140 B2 * | 8/2006 | Hsu et al. | 713/300 |
| 7,222,253 B2 * | 5/2007 | Samson et al. | 713/323 |
| 7,268,527 B2 * | 9/2007 | Horner | 323/285 |
| 7,321,523 B2 * | 1/2008 | Ke | 365/226 |
| 7,334,137 B2 * | 2/2008 | Jung et al. | 713/300 |
| 7,337,339 B1 * | 2/2008 | Choquette et al. | 713/320 |
| 7,642,764 B2 * | 1/2010 | Burton et al. | 323/283 |
| 2001/0042216 A1 * | 11/2001 | Jung et al. | 713/300 |
| 2002/0079874 A1 * | 6/2002 | Horigan et al. | 323/283 |
| 2003/0080718 A1 * | 5/2003 | McDonald et al. | 323/286 |
| 2003/0101362 A1 * | 5/2003 | Dia | 713/300 |

(Continued)

FOREIGN PATENT DOCUMENTS

JP  04-317523  11/1992

(Continued)

OTHER PUBLICATIONS

Japanese Office Action dated Feb. 8, 2011.

*Primary Examiner* — Thomas Lee
*Assistant Examiner* — Jaweed A Abbaszadeh
(74) *Attorney, Agent, or Firm* — Pillsbury Winthrop Shaw Pittman, LLP (57) ABSTRACT

According to one embodiment, a controller to control voltages supplied to a first circuit unit and a second circuit unit arranged in a semiconductor module, includes a first power control unit configure to supply a control signal to determine a set voltage to a first power supply which supplies a drive voltage of a value corresponding to an output current to the first circuit unit along the set voltage and a loadline specifications, the set voltage being changed in accordance with a load condition with an operation of the semiconductor module, and a second power control unit configure to supply a control signal to supply a second voltage value to a second power supply which supplies a drive voltage to the second circuit unit.

14 Claims, 5 Drawing Sheets

U.S. PATENT DOCUMENTS

| | | | |
|---|---|---|---|
| 2004/0003310 A1* | 1/2004 | Hsu et al. | 713/320 |
| 2004/0054936 A1* | 3/2004 | Dwyer et al. | 713/300 |
| 2004/0117678 A1* | 6/2004 | Soltis et al. | 713/320 |
| 2004/0124878 A1* | 7/2004 | Varadarajan | 326/81 |
| 2005/0210302 A1 | 9/2005 | Kato et al. | |
| 2005/0283630 A1 | 12/2005 | Shikata | |
| 2006/0099734 A1* | 5/2006 | Narendra et al. | 438/107 |
| 2007/0070673 A1* | 3/2007 | Borkar et al. | 365/63 |
| 2007/0200538 A1* | 8/2007 | Tang et al. | 323/237 |
| 2007/0229147 A1* | 10/2007 | Doyle et al. | 327/540 |
| 2008/0122412 A1* | 5/2008 | Burton et al. | 323/234 |

FOREIGN PATENT DOCUMENTS

| | | |
|---|---|---|
| JP | 08-339682 | 12/1996 |
| JP | 2002-527016 | 8/2002 |
| JP | 2005-268768 | 9/2005 |

* cited by examiner

CONTROLLER, INFORMATION PROCESSING APPARATUS AND SUPPLY VOLTAGE CONTROL METHOD

CROSS-REFERENCE TO RELATED APPLICATIONS

This application is based upon and claims the benefit of priority from Japanese Patent Application No. 2006-324912, filed Nov. 30, 2006, the entire contents of which are incorporated herein by reference.

BACKGROUND

1. Field

One embodiment of the present invention relates to a controller, an information processing apparatus and a supply voltage control method for supplying a plurality of drive voltages to a semiconductor module.

2. Description of the Related Art

In the semiconductor process on the order of 65 nm, the read/write performance and the stability of the memory array unit cannot be guaranteed at the operating voltage of the logic units lower than 1V (the operating voltage is further reduced with the progress of miniaturization of the process to 45 nm or 32 nm). In view of this, the design to isolate the power supply of the memory array unit from the power supply of the logic units has begun to be introduced in order to supply a voltage (higher than in the logic units) for stable operation of the memory array unit with the aim of improving the characteristics of the memory array unit without increasing the power consumption of the logic units (Jpn. Pat. Appln. KOKAI Publication No. 2005-268768).

With the increase in the difference between the drive voltage of the memory array unit and the drive voltage of the logic units, however, the communication between the memory array unit and the logic units is liable to be destabilized.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

DETAILED DESCRIPTION

Various embodiments according to the invention will be described hereinafter with reference to the accompanying drawings. In general, according to one embodiment of the invention, an controller to control voltages supplied to a first circuit unit and a second circuit unit arranged in a semiconductor module, the controller comprises a first power control unit configure to supply a control signal to determine a set voltage to a first power supply which supplies a drive voltage of a value corresponding to an output current to the first circuit unit along the set voltage and a loadline specifications, the set voltage being changed in accordance with a load condition with an operation of the semiconductor module, and a second power control unit configure to supply a control signal to supply a second voltage value to a second power supply which supplies a drive voltage to the second circuit unit.

Figure 1:
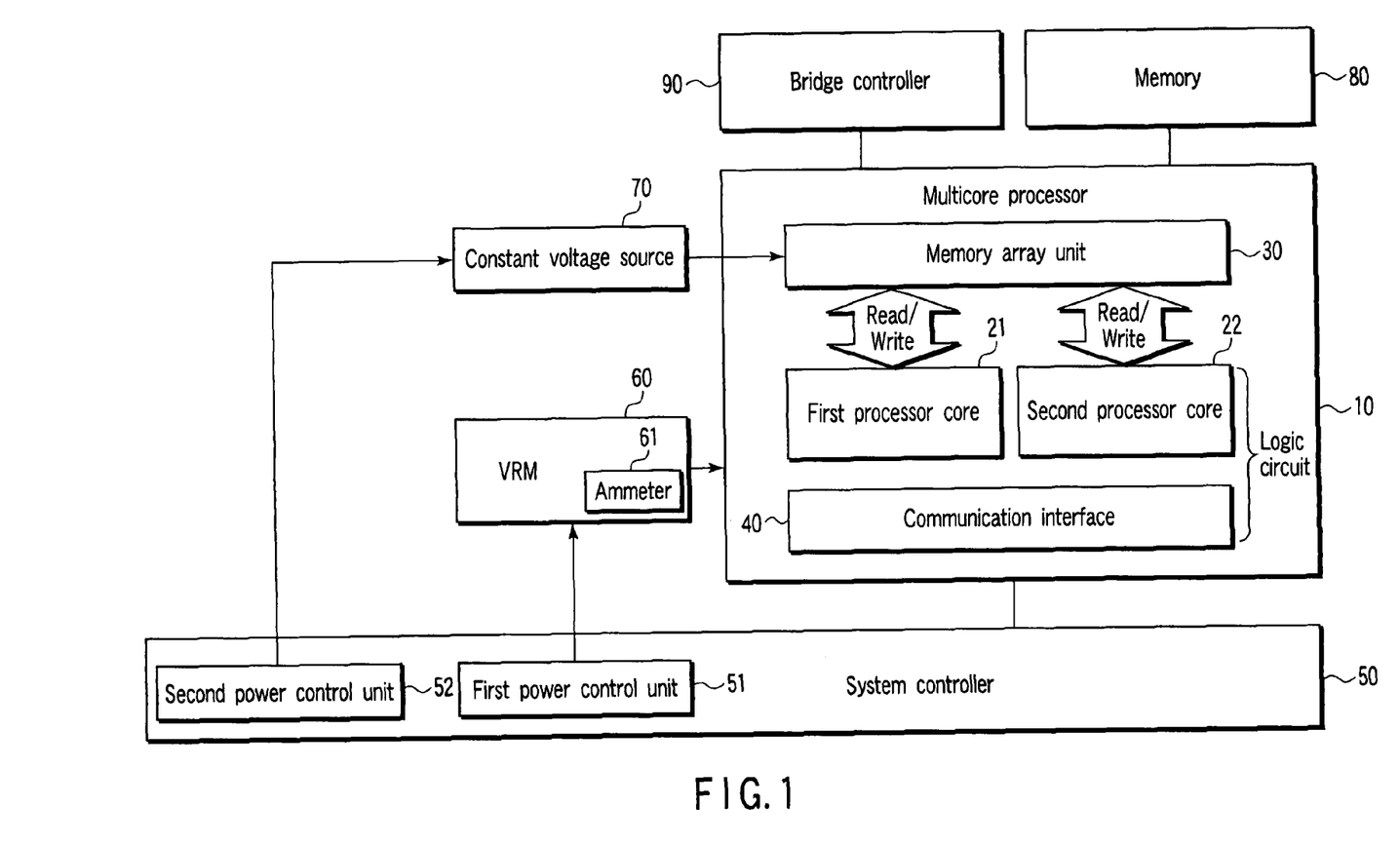
FIG. 1 is an exemplary block diagram showing an example of the system configuration of an information processing apparatus according to a first embodiment.

FIG. 1 is a block diagram showing an example of the system configuration of an information processing apparatus according to an embodiment of the invention.

This information processing apparatus, as shown in FIG. 1, includes a multicore processor 10 as a semiconductor module, a system controller 50, a voltage regulator module (VRM) 60, a constant voltage source 70, a main memory 80 and a bridge controller 90.

The multicore processor 10 has a first processor core 21, a second processor core 22, a memory array unit 30 and a communication interface 40. The first processor core 21 and the second processor core 22 is provided to control the operation of this computer system and execute the operating system (OS) and the application program loaded in the main memory 80 from an external storage device.

The memory array unit 30 is a cache memory or a register file configured of an SRAM. Also, the communication interface 40 is a circuit for establishing communication with the system controller 50 and the bridge controller 90.

The system controller 50 has a first power control unit 51 and a second power control unit 52 for controlling the power supply of the multicore processor 10. The first power control unit 51 supplies a VID (Voltage Identification) code to the VRM 60 on the one hand and controls the on/off operation of the VRM 60 on the other hand. The second power control unit 52 controls the on/off operation of the constant voltage source 70.

The bridge controller 90 has a video output circuit for outputting video data calculated by the multicore processor 10 to a display unit, an audio input/output circuit, a digital video input/output interface, an IEEE1394 controller, a network controller, a PCI controller, a PCI express controller, a USB controller and an ATA controller.

In the multicore processor 10 fabricated through the fine process on the order of 65 nm or less, the power supply of the memory array unit and the power supply of the logic units are isolated from each other to set the former at a higher level than the latter with the aim of securing the read performance, the write performance and the reliability of the memory array unit.

The memory array unit 30 is supplied with power from the constant voltage source 70, while the logic units including the first processor core 21, the second processor core 22 and the communication interface 40 other than the memory array unit 30 are supplied with power from the VRM (Voltage Regulator Module) 60.

The constant voltage source 70 is a DC/DC converter of constant voltage type for supplying power to the memory array unit 30 of the multicore processor 10.

The VRM 60 is a DC/DC converter of voltage control type corresponding to the output current for supplying power to the logic units of the multicore processor. The output voltage of the VRM 60 for the logic unit current (Idd−L)=0 A is set arbitrarily according to the VID code. In the VRM according to this embodiment, the output voltage is controlled in accordance with the supply current detected by an ampere meter 61 along the loadline specifications (1.2 mΩ in the configuration example shown).

Figure 2:
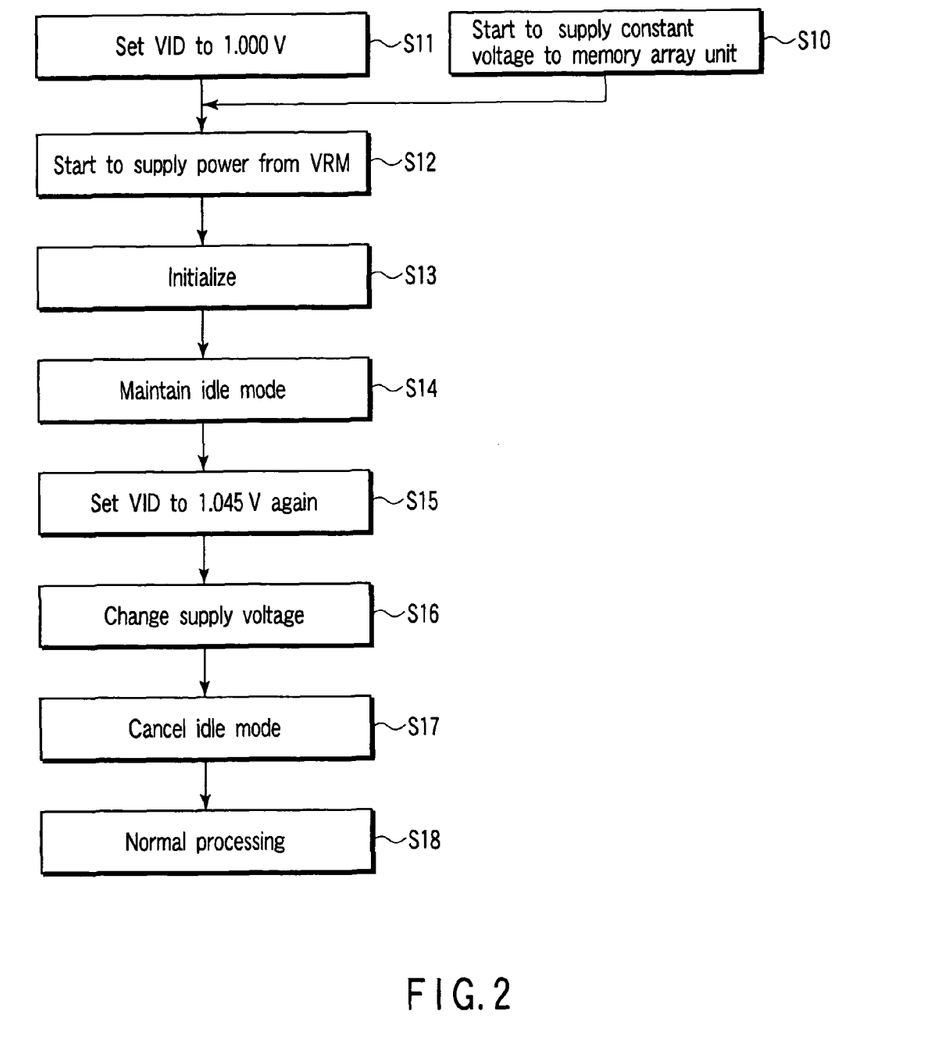
FIG. 2 is an exemplary flowchart showing the procedures of the voltage control process in a first power control unit and a second power control unit of the information processing apparatus shown in FIG. 1.
Figure 3:
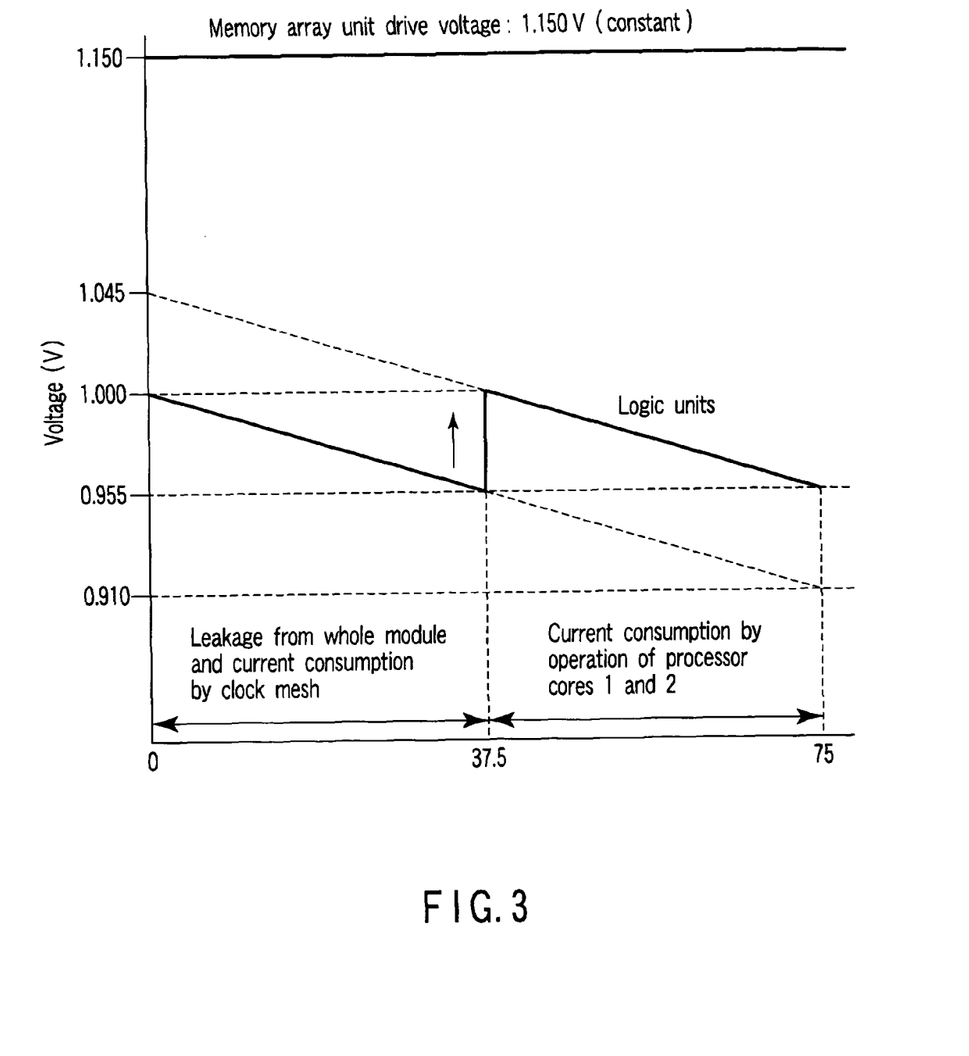
FIG. 3 shows the change of the voltage supplied to the memory array unit and the logic units shown in FIG. 1.

In this system configuration, the initialization of the VID and the memory array unit module of the multicore processor are controlled in accordance with the flowchart of FIG. 2. In this embodiment, an explanation will be given about the control operation with about one half of the power consumed in the idle mode. Also, FIG. 3 shows the change of the voltage supplied to the memory array unit and the logic units.

The second power control unit 52 turns on the constant voltage source 70 and supplies the voltage of a constant value to the memory array unit 30 of the multicore processor 10 (step S10).

The VID code corresponding to the start voltage (for example, 1.000V) required by the multicore processor 10 is supplied to the VRM 60 from the first power control unit 51 (step S1). The VRM supplies the logic units with the power corresponding to the output current along the loadline specifications of 1.2 mΩ with 1.000V as an initial voltage in accordance with the VID code (step S12). The initial voltage is the supply voltage for the output current of 0 A.

After the power supplies of the memory array unit and the core units are switched on, the multicore processor is initialized (step S13). Under this condition, the leakage current of the multicore processor and the current consumption of the clock mesh are reduced to about one half (37.5 A) of the power consumption of 75 A under the maximum load.

With the idle mode maintained before starting to use each processor core in the multicore processor after initialization (step S14), the first power control unit 51 supplies the VID code corresponding to 1.045V (=1.000V+½×75 A×1.2 mΩ) to the VRM 60 (step S15). The VRM 60 supplies the power corresponding to the output current to the logic units along the loadline specifications of 1.2 mΩ with 1.045V as an initial voltage in accordance with the VID code (step S16).

After that, the idle mode is canceled (step S17), and each processor core in the multicore processor begins to be used (step S18).

By changing the VID code to a code corresponding to 1.045V after initialization, the maximum voltage variation between the drive voltage of 1.150V of the memory array unit and the minimum drive voltage of 0.955V (=1.000V−½×75 A×1.2 mΩ) of the logic units is reduced to 45 mV. Without this control operation, the maximum voltage variation between the drive voltage of the memory array unit and the minimum drive voltage of 0.910V (=1.000V−75 A×1.2 mΩ) of the logic units is 90 mV.

Without the voltage control operation in this apparatus, the maximum voltage variation is 90 mV, while the maximum voltage variation is reduced to 45 mV, i.e. about one half by performing the voltage control operation in this apparatus.

In the case where the source voltage of the memory array unit is isolated from that of the logic units communicating with the memory array unit, a large variation of the difference between the source voltages of the memory array unit and the core units would cause the following phenomenon in the access from the logic units to the memory array unit.

In the case where the voltage of the power supply for the logic units is high (the signal delay time of the logic units is short), the setup time for establishing the communication between the memory array unit 30 and the logic units is shortened.

In the case where the voltage of the power supply for the logic units is low (the signal delay time of the logic units is long), on the other hand, the hold time to establish the communication between the memory array unit 30 and the logic units is shortened, and therefore, an upper limit Fmax of the operating frequency of the module as a whole is limited (the upper limit Fmax of the operating frequency to stabilize the read/write operation is reduced).

By controlling the power supply of the logic units as in the apparatus according to this invention, however, the variation of the difference between the source voltages of the memory array unit and the core units is reduced from 90 mV to 45 mV. Thus, the variation of the setup/hold time at the boundary between the memory array unit and the logic units attributable to the voltage variation of the power supply of the logic units, i.e. the limitation of the operating frequency is relaxed, so that the module can be operated with a higher frequency.

Second Embodiment

In this embodiment, an explanation will be given about the control operation in the case where the increase in power consumption in the idle mode and the operation of each processor core is substantially equal.

Figure 4:
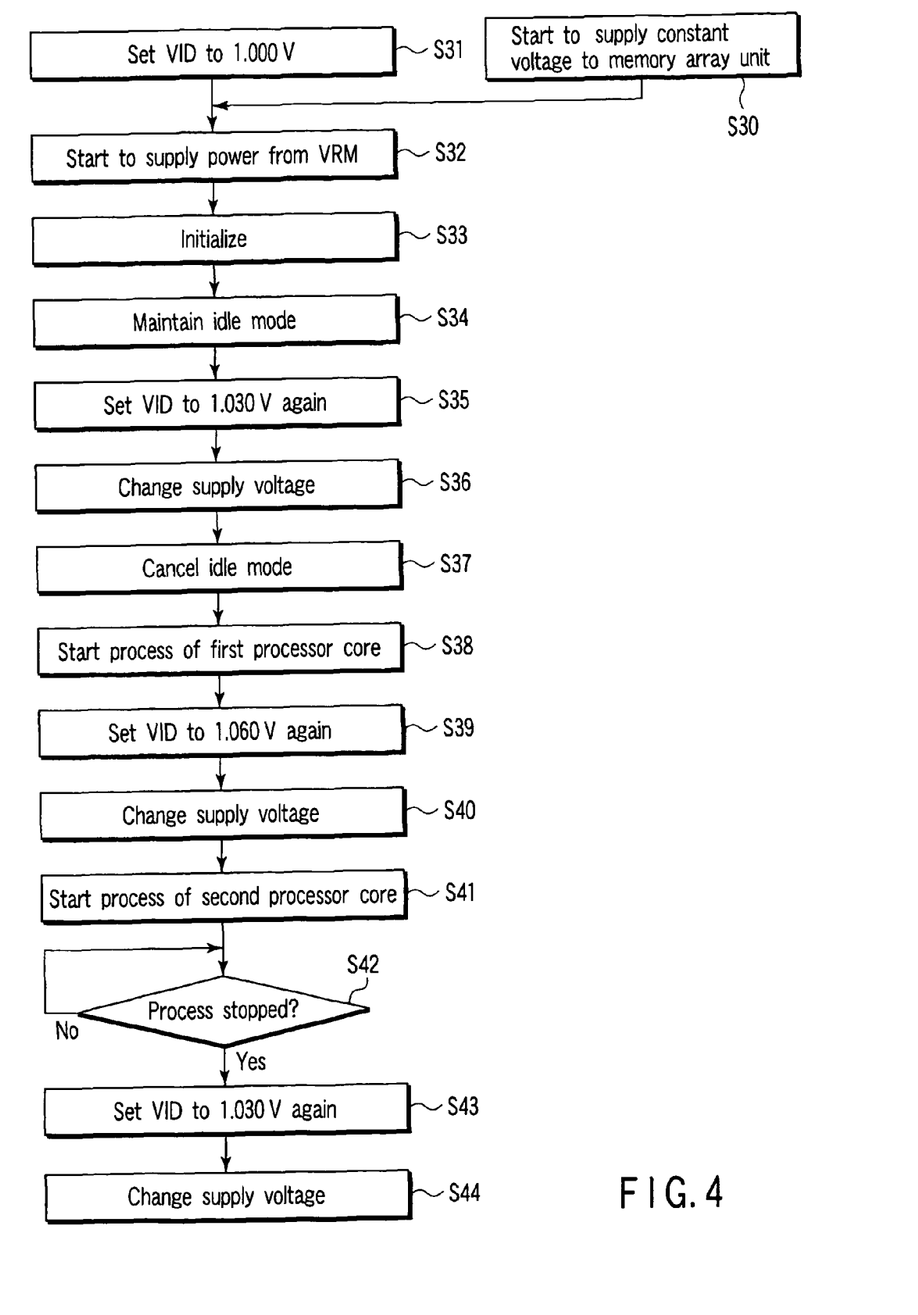
FIG. 4 is an exemplary flowchart showing the procedures of the voltage control process in the first power control unit and the second power control unit according to a second embodiment.
Figure 5:
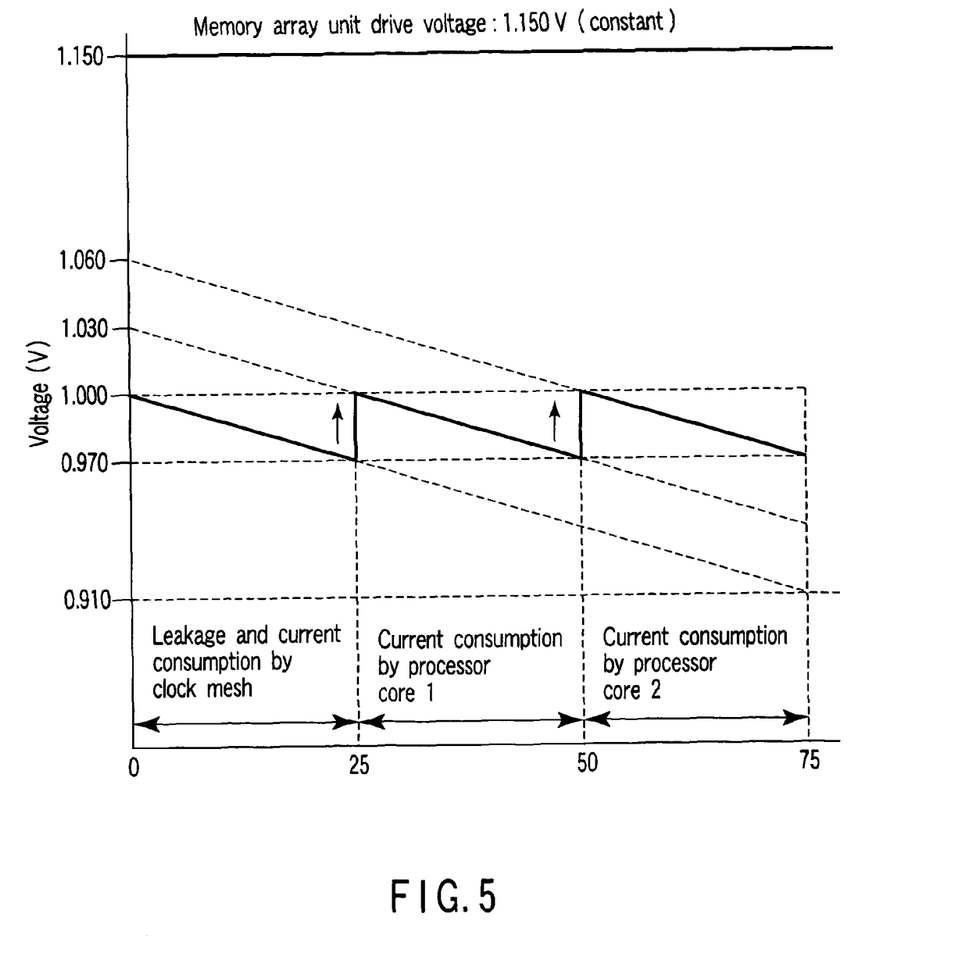
FIG. 5 is an exemplary diagram showing the change of the voltage supplied to the memory array unit and the logic units according to the second embodiment.

In the system configuration described above, the initialization of the memory array unit module of the multicore processor and the VID code is controlled in accordance with the flow chart shown in FIG. 4 and the relation between the current and the voltage shown in FIG. 5.

The second power control unit 52 turns on the constant voltage source 70 and supplies a predetermined value of voltage to the memory array unit 30 of the multicore processor 10 (step S30).

The VID code corresponding to the start voltage (for example, 1.000V) required by the multicore processor 10 is supplied from the system controller to the VRM 60 (step S31). The VRM 60 supplies the power corresponding to the output current to the logic units along the loadline specifications of 1.2 mΩ with 1.000V as an initial voltage in accordance with the VID code (step S32). Incidentally, the initial voltage is defined as the supply voltage for the output current of 0 A.

After the power supplies of the memory array unit 30 and the logic units are switched on, the multicore processor 10 is initialized (step S33). Under this condition, the leakage current of the multicore processor 10 and the current consumption in the clock mesh are reduced to about one third (=25 A) of the power consumption of 75 A under the maximum load.

With the idle mode maintained before starting to use each processor core 21, 22 in the multicore processor 10 after initialization (step S34), the first power control unit 51 supplies the VID code corresponding to 1.030V (=1.000V+⅓× 75 A×1.2 mΩ) to the VRM 60 (step S35). The VRM 60 supplies the power corresponding to the output current to the logic units along the loadline specifications of 1.2 mΩ with 1.030V as an initial voltage in accordance with the VID code (step S36). After that, the idle mode is canceled (step S37), and the first processor core 21 in the multicore processor 10 begins to be used (step S38).

Before starting to use the second processor core 22, the first power control unit 51 supplies the VID code corresponding to 1.060V (=1.000V+⅔×75 A×1.2 mΩ) to the VRM 60 (step S39). The VRM 60 supplies the power corresponding to the output current to the logic units along the loadline specifications of 1.2 mΩ with 1.060V as an initial voltage in accordance with the VID code (step S40). After that, the second processor core 22 in the multicore processor 10 begins to be used (step S41).

At the subsequent time point when the process of the second processor core 22 stops (YES in step S42), the VID code supplied to the VRM 60 is returned to 1.030V by the first power control unit 51 (step S43). Then, the VRM 60 supplies the power corresponding to the output current to the logic units along the loadline specifications of 1.2 mΩ with 1.030V as an initial voltage in accordance with the VID code (step S44).

The VID code is changed to the one corresponding to 1.030V before starting the process of the first core processor 21 and to the one corresponding to 1.060V before starting the process of the second core processor 22. Thus, the maximum voltage variation between the drive voltage of 1.150V of the memory array unit and the minimum drive voltage of 0.970V (=1.000V−⅓×75 A×1.2 mΩ) of the logic units is reduced to 45 mV. Without this control operation, the maximum voltage variation between the drive voltage of the memory array unit and the minimum drive voltage of 0.910V (=1.000V−75 A×1.2 mΩ) of the logic units is 90 mV.

Without the voltage control operation in this apparatus, the maximum voltage variation is 90 mV, while the maximum voltage variation is reduced to 30 mV with the voltage control operation in this apparatus. Thus, the maximum voltage variation is reduced to one half with the voltage control operation in this apparatus.

In the case where the source voltages of the memory array unit and the logic units communicating with the memory array unit are isolated from each other, a large variation of the difference between the source voltages of the memory array unit and the core unit would cause the following phenomenon in the access from the logic units to the memory array unit.

In the case where the voltage of the power supply of the logic units is high (the signal delay time of the logic units is short), the setup time is shortened.

In the case where the voltage of the power supply of the logic units is low (the signal delay time of the logic units is long), on the other hand, the hold time is shortened, and therefore, the upper limit Fmax of the operating frequency of the module as a whole is limited (Fmax for stabilizing the read/write operation is reduced).

By controlling the power supply of the logic units as in the apparatus according to this invention, however, the variation of the difference between the source voltages of the memory array unit and the core units is reduced from 90 mV to 30 mV. Thus, the variation of the setup/hold time at the boundary between the memory array unit and the logic units attributable to the voltage variation of the power supply of the logic units (limitation of the operating frequency) is relaxed, and the operation of the module with a higher frequency is made possible.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A controller to control voltages supplied to a first circuit unit and a second circuit unit arranged in a semiconductor module, comprising:
   a first power controller configured to supply a first control signal corresponding to a first voltage value to a first power module which supplies a first drive voltage corresponding to an output current to the first circuit unit along the first voltage value and a loadline specifications, and to supply a second control signal corresponding to a second voltage value larger than the first voltage value to the first power module which supplies a second drive voltage corresponding to the output current along the second voltage value and the loadline specifications after the first control signal is supplied to the first power module; and
   a second power controller configured to control on/off operation of a second power module which supplies a third voltage value larger than the second voltage value to the second circuit unit.

2. The controller according to claim 1, wherein the first circuit unit is a logic circuit and the second circuit unit is a memory array.

3. The controller according to claim 2, wherein the first power controller is configured to supply the second control signal after ending initialization of the semiconductor module.

4. The controller according to claim 2, wherein the first circuit unit includes a first processor and a second processor, and
   the first power controller is configured to supply the second control signal before starting process of the first processor and to supply a third control signal corresponding a fourth voltage value to the first power module which supplies a fourth drive voltage corresponding to the output current along the fourth voltage value and the loadline specifications before starting process of the second processor after starting the process of the first processor.

5. The controller according to claim 2, wherein the second power module is a constant voltage source which supplies the third voltage value.

6. An information processing apparatus comprising:
   a semiconductor module having a first circuit unit and a second circuit unit;
   a first power module configured to supply a drive voltage corresponding to a value of an output current to the first circuit unit along a voltage value corresponding to a control signal and a loadline specifications;
   a second power module configured to supply a drive voltage to the second circuit unit;
   a first power controller configured to supply a first control signal corresponding to a first voltage value to the first power module, and to supply a second control signal corresponding to a second voltage value larger than the first voltage value to the first power module after the first control signal is supplied to the first power module; and
   a second power controller configured to control on/off operation of which supplies a third voltage value larger than the second voltage value to the second power module.

7. The information processing apparatus according to claim 6, wherein the first circuit unit is a logic circuit and the second circuit unit is a memory array.

8. The information processing apparatus according to claim 7, wherein the first power controller is configured to supply the second control signal after ending initialization of the semiconductor module.

9. The information processing apparatus according to claim 7, wherein the first circuit unit includes a first processor and a second processor, and
   the first power controller is configured to supply the second control signal before starting process of the first processor, and the first power controller is configured to supply a third control signal corresponding to a fourth voltage value to the first power module before starting process of the second processor after starting the process of the first processor.

10. The information processing apparatus according to claim 6, wherein the second power module is a constant voltage source which supplies the third voltage value.

11. A supply voltage control method for controlling a voltage supplied to a first circuit unit and a second circuit unit arranged in a semiconductor module, the method comprising:
   supplying a first control signal corresponding to a first voltage value to a first power module;
   supplying, to the first circuit unit from the first power supply unit, a first drive voltage corresponding to a value of an output current to the first circuit unit along the first voltage value and a loadline specifications;
   supplying a second control signal corresponding to a second voltage value larger than the first voltage value to the first power module;
   supplying, to the second circuit unit from the first power module, a second drive voltage corresponding to a value of the output current along the second voltage value and the loadline specifications; and
   supplying a third drive voltage value larger than the second voltage value to the second circuit unit.

12. The supply voltage control method according to claim 11, wherein the first circuit unit is a logic circuit and the second circuit unit is a memory array.

13. The supply voltage control method according to claim 11, wherein the first circuit unit includes a processor,
   the first control signal is supplied to the first power module before initialization of the semiconductor module, and
   the second control signal is supplied to the first power module after initialization of the semiconductor module.

14. The supply voltage control method according to claim 11, wherein the first circuit unit includes a first processor and a second processor,
   the first control signal is supplied to the first power module before initialization of the semiconductor module, and
   the second control signal is supplied to the first power module before starting process of the first processor,
   the method further comprising;
   supplying a third control signal corresponding to a fourth voltage value to the first power module; and
   supplying, to the first circuit unit from the first power module, a third drive voltage corresponding to a value of the output current along the third voltage value and the loadline specifications before starting process of the second processor after starting the process of the first processor.

* * * * *